(12) United States Patent
Kodama

(10) Patent No.: US 9,969,261 B2
(45) Date of Patent: May 15, 2018

(54) VEHICLE ASSISTANCE CONTROL APPARATUS

(71) Applicant: TOYOTA JIDOSHA KABUSHIKI KAISHA, Toyota-shi (JP)

(72) Inventor: Shinya Kodama, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/035,800

(22) PCT Filed: Nov. 17, 2014

(86) PCT No.: PCT/IB2014/002442
§ 371 (c)(1),
(2) Date: May 11, 2016

(87) PCT Pub. No.: WO2015/075519
PCT Pub. Date: May 28, 2015

(65) Prior Publication Data
US 2017/0246954 A1    Aug. 31, 2017

(30) Foreign Application Priority Data

Nov. 21, 2013 (JP) ................................. 2013-241192

(51) Int. Cl.
*B60K 28/10* (2006.01)
*B60W 50/10* (2012.01)
*B60W 50/14* (2012.01)

(52) U.S. Cl.
CPC ............. *B60K 28/10* (2013.01); *B60W 50/10* (2013.01); *B60W 50/14* (2013.01);
(Continued)

(58) Field of Classification Search
CPC ....... B60K 28/10; B60W 50/10; B60W 50/14; B60W 2050/143; B60W 2050/146;
(Continued)

(56) References Cited

U.S. PATENT DOCUMENTS

| 2005/0030184 A1* | 2/2005 | Victor | ................... | B60K 28/06 340/576 |
| 2005/0137766 A1* | 6/2005 | Miyakoshi | ................ | B60T 7/22 701/36 |

(Continued)

FOREIGN PATENT DOCUMENTS

| JP | 5-124453 A | 5/1993 |
| JP | 2002-127855 A | 5/2002 |

(Continued)

OTHER PUBLICATIONS

International Search Report dated Aug. 25, 2015, in PCT/IB2014/002442 filed Nov. 17, 2014.

*Primary Examiner* — Atul Trivedi
(74) *Attorney, Agent, or Firm* — Oblon, McClelland, Maier & Neustadt, L.L.P.

(57) ABSTRACT

A vehicle assistance control apparatus includes: an obstacle detection unit that detects a prescribed obstacle in the periphery of a vehicle; a vehicle speed detection unit that detects a speed of the vehicle; an accelerator operation detection unit that detects presence of an accelerator operation; a drive power restriction unit that detects, when the prescribed obstacle is detected, a drive power that is to be generated in the vehicle by an accelerator operation performed by a driver, compared to when the prescribed obstacle is not detected; and a cancellation unit that enables cancellation of the restriction of the drive power by the drive power restriction unit, when the speed is equal to or lower than a prescribed value and when a state where the accelerator operation detection unit detects that the accelerator (Continued)

operation is not being performed has continued for a prescribed period of time or longer.

19 Claims, 4 Drawing Sheets

(52) U.S. Cl.
CPC . *B60W 2050/143* (2013.01); *B60W 2050/146* (2013.01); *B60W 2520/10* (2013.01); *B60W 2540/04* (2013.01); *B60W 2540/10* (2013.01); *B60W 2550/10* (2013.01); *B60W 2710/0677* (2013.01)

(58) Field of Classification Search
CPC ......... B60W 2520/10; B60W 2540/04; B60W 2540/10; B60W 2550/10; B60W 2710/0677
USPC .......................................................... 701/99
See application file for complete search history.

(56) References Cited

U.S. PATENT DOCUMENTS

| | | | | |
|---|---|---|---|---|
| 2007/0152804 A1* | 7/2007 | Breed | ................. | B60N 2/2863 340/435 |
| 2009/0187322 A1* | 7/2009 | Yasui | .................... | B60W 10/06 701/70 |
| 2013/0143716 A1* | 6/2013 | Kodama | ............... | B60W 10/04 477/109 |
| 2014/0142797 A1* | 5/2014 | Otake | ................... | B60W 20/00 701/22 |

FOREIGN PATENT DOCUMENTS

| | | |
|---|---|---|
| JP | 2004-280489 A | 10/2004 |
| JP | 2013-133770 A | 7/2013 |

* cited by examiner

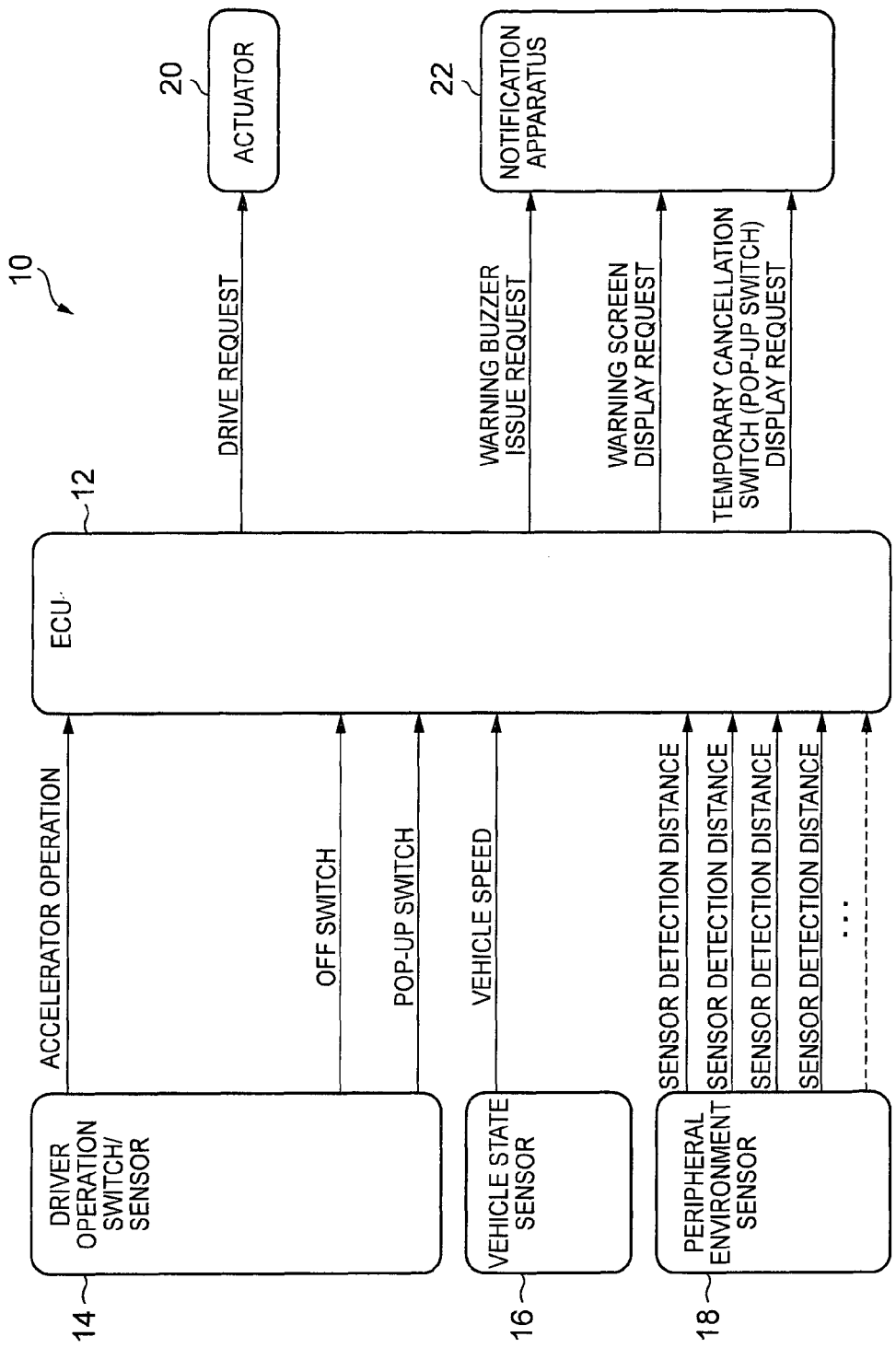

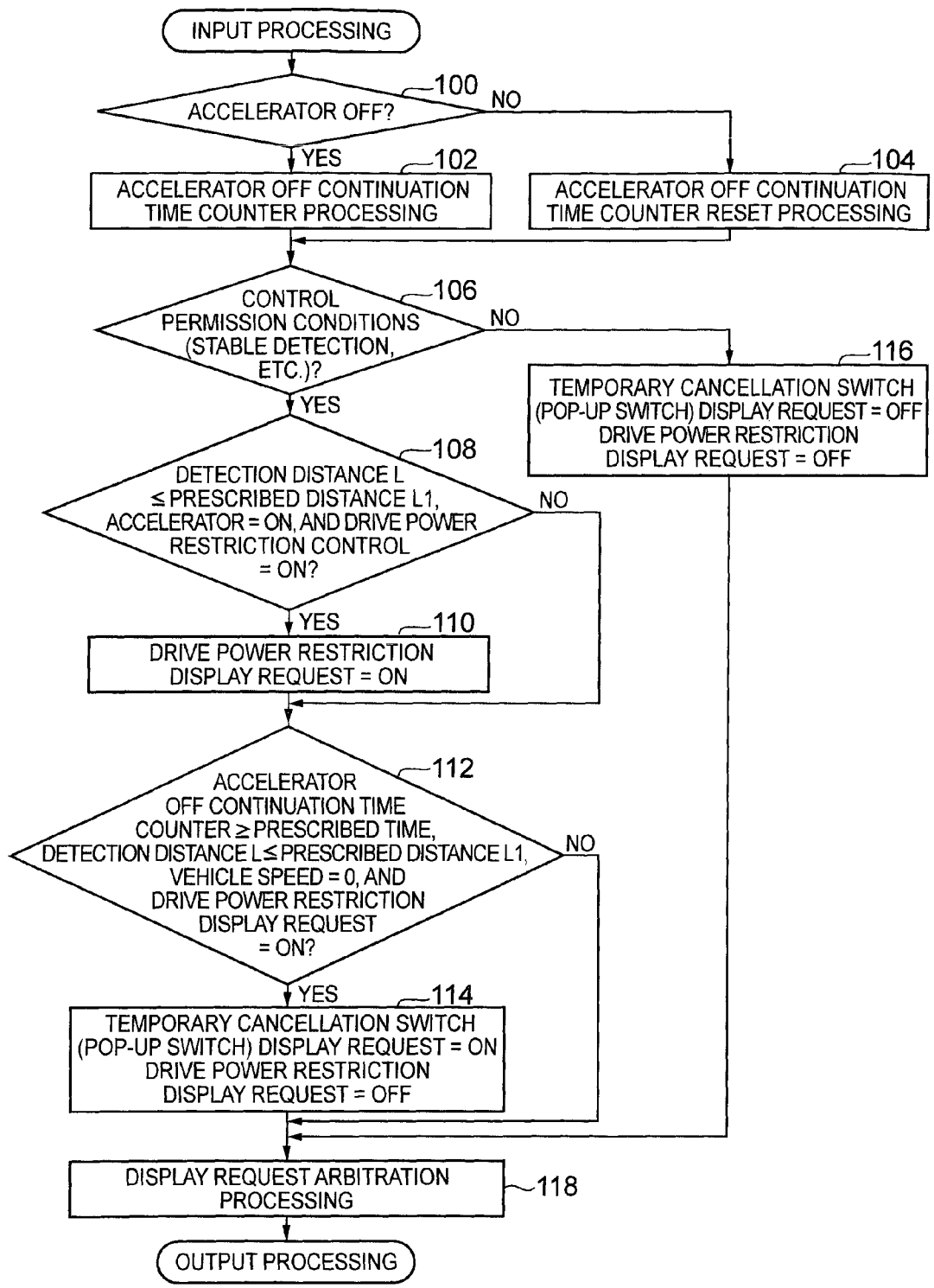

VEHICLE ASSISTANCE CONTROL APPARATUS

BACKGROUND OF THE INVENTION

1. Field of the Invention

This invention relates to a vehicle assistance control apparatus.

2. Description of Related Art

A vehicle assistance control apparatus is available, in which sudden movement of a host vehicle is prohibited on the basis of an obstacle present in the periphery of the vehicle (see, for example, Japanese Patent Application Publication No. 5-124453 (JP 5-124453 A) and Japanese Patent Application Publication No. 2013-133770 (JP 2013-133770 A)). The apparatus described in JP 5-124453 A prohibits sudden movement of the host vehicle by restricting the drive power of the host vehicle in such a manner that the engine number of revolutions does not increase beyond a prescribed level, when a detected obstacle is situated within a prescribed distance from the host vehicle. Consequently, according to this apparatus, it is possible to diminish shocks with obstacles due to sudden starting off of the host vehicle.

Furthermore, the apparatus described in JP 2013-133770 A prohibits sudden movement by restricting the drive power of the host vehicle when an increase in the acceleration depression amount is detected due to an accelerator operation, in cases where a detected obstacle is situated within a prescribed distance from the host vehicle, whereas the abovementioned prohibition of sudden movement (in other words, restriction of the drive power) is cancelled in cases where the host vehicle speed is zero and a state of the accelerator depression amount being equal to or greater than a prescribed amount due to an accelerator operation has continued for a prescribed period of time or longer. Consequently, according to this apparatus, it is possible to generate a large torque, as normal, according to the driver's wishes, when it is necessary, for instance, to drive the host vehicle over an obstacle such as a step, or the like, while preventing collision with an obstacle due to sudden starting off the host vehicle.

However, in the apparatus described in JP 5-124453 A, the drive power is always restricted when an obstacle is situated within a prescribed distance. Consequently, for instance, when snow or dirt becomes attached to the sensor which detects obstacles, then there is a possibility of the sensor erroneously recognizing that an obstacle is situated within a prescribed distance, and hence of not being able to ensure normal accelerating performance in accordance with the accelerator operation.

Furthermore, in the apparatus described in JP 2013-133770 A, even after the drive power of the host vehicle has been restricted, the restriction of drive power is cancelled provided that prescribed conditions are established, and therefore it is possible to ensure normal acceleration performance in accordance with the driver's wishes. However, since the fact that an accelerator operation has continued for a prescribed time or longer is specified as a condition for cancelling the restriction of drive power, then it is not possible to cancel the restriction of drive power unless the accelerator operation has continued for a prescribed time or longer. For example, when the host vehicle is being driven over an obstacle, such as a step, or the like, there is a possibility that the restriction of drive power will not be cancelled if the driver interrupts the accelerator operation midway through.

SUMMARY OF THE INVENTION

This invention provides a vehicle assistance control apparatus whereby the restriction of drive power of a host vehicle can be cancelled reliably in circumstances where the restriction of drive power should not be carried out.

A vehicle assistance control apparatus relating to a first aspect of this invention includes: obstacle detection means for detecting a prescribed obstacle in the periphery of a host vehicle; host vehicle speed detection means for detecting a speed of the host vehicle; accelerator operation detection means for detecting presence or absence of an accelerator operation; drive power restriction means for restricting, when the prescribed obstacle is detected by the obstacle detection means, a drive power that is to be generated in the host vehicle by an accelerator operation performed by a driver, compared to when the prescribed obstacle is not detected; and cancellation means for enabling cancellation of the restriction of the drive power by the drive power restriction means by a cancelling operation performed by the driver, when the speed detected by the host vehicle speed detection means is equal to or lower than a prescribed value and when a state where the accelerator operation detection means detects that the accelerator operation is not being performed has continued for a prescribed period of time or longer.

A vehicle assistance control apparatus relating to a second aspect of this invention includes: obstacle detection means for detecting a prescribed obstacle in the periphery of a host vehicle; accelerator operation detection means for detecting presence or absence of an accelerator operation; host vehicle speed detection means for detecting a speed of the host vehicle; drive power restriction means for restricting, when the prescribed obstacle is detected by the obstacle detection means, a drive power that is to be generated in the host vehicle by an accelerator operation performed by a driver, compared to when the prescribed obstacle is not detected; stuck state determination means for determining that the host vehicle is stuck, from when the accelerator operation detection means detects that the accelerator operation is being performed and the speed detected by the host vehicle speed detection means starts to be equal to or lower than a prescribed value, until the speed becomes greater than the prescribed value; and cancellation means for enabling cancellation of the restriction of the drive power by the drive power restriction means by a cancelling operation performed by the driver, when a state where the stuck state determination means determines that the host vehicle is stuck has continued for a prescribed time period or more.

A vehicle assistance control apparatus relating to a third aspect of this invention includes: an obstacle detection unit that detects a prescribed obstacle in the periphery of a host vehicle; a host vehicle speed detection unit that detects a speed of the host vehicle; an accelerator operation detection unit that detects presence or absence of an accelerator operation; and an electronic control unit configured to: restrict, when the prescribed obstacle is detected by the obstacle detection unit, a drive power that is to be generated in the host vehicle by an accelerator operation performed by a driver, compared to when the prescribed obstacle is not detected; and enable cancellation of the restriction of the drive power by a cancelling operation performed by the driver, when the speed detected by the host vehicle speed detection unit is equal to or lower than a prescribed value and when a state where the accelerator operation detection unit detects that the accelerator operation is not being performed has continued for a prescribed period of time or longer.

A vehicle assistance control apparatus relating to a fourth aspect of this invention includes: an obstacle detection unit that detects a prescribed obstacle in the periphery of a host vehicle; an accelerator operation detection unit that detects presence or absence of an accelerator operation; a host vehicle speed detection unit that detects a speed of the host vehicle; and an electronic control unit configured to: restrict, when the prescribed obstacle is detected by the obstacle detection unit, a drive power that is to be generated in the host vehicle by an accelerator operation performed by a driver, compared to when the prescribed obstacle is not detected; determine that the host vehicle is stuck, from when the accelerator operation detection unit detects that the accelerator operation is being performed and the speed detected by the host vehicle speed detection unit starts to be equal to or lower than a prescribed value, until the speed becomes greater than the prescribed value; and cancel the restriction of the drive power by a cancelling operation performed by the driver, when a state where the host vehicle is determined to be stuck has continued for a prescribed period of time or longer.

According to the aspects described above, it is possible to cancel the drive power restriction reliably in circumstances where drive power restriction is not to be implemented in the host vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a schematic drawing of a vehicle assistance control apparatus which is a first embodiment of this invention;

FIG. 2 is a flowchart of one example of a control routine which is executed in controlling the display on a display panel in a vehicle assistance control apparatus according to the first embodiment;

DETAILED DESCRIPTION OF EMBODIMENTS

Figure 3A:
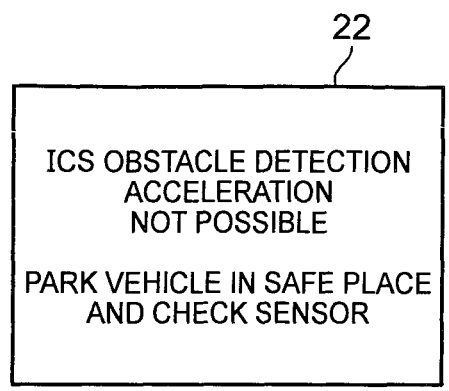
FIGS. 3A and 3B are diagrams showing one example of a display screen which is shown on a display panel in the vehicle assistance control apparatus according to the first embodiment.

Below, concrete embodiments of the vehicle assistance control apparatus relating to this invention will be described with reference to the drawings.

FIG. 1 is a schematic drawing of a vehicle assistance control apparatus 10 which is a first embodiment of this invention. The vehicle assistance control apparatus 10 according to this embodiment is mounted in a vehicle and carries out assistance for avoiding a collision of the host vehicle with a peripheral obstacle.

As shown in FIG. 1, the vehicle assistance control apparatus 10 is provided with an electronic control unit (hereinafter called "ECU") 12 which is constituted principally by a microcomputer. As assistance for avoiding a collision of the host vehicle with a peripheral obstacle, the ECU 12 implements control (hereinafter called "drive power restriction control") for restricting the drive power (in other words, limiting the acceleration) that is to be generated in the host vehicle by an accelerator operation. Furthermore, as described below, the ECU 12 carries out processing for stopping the implementation of the drive power restriction control and thereby cancelling the drive power restriction, when prescribed cancellation conditions are established.

A driver operation switch/sensor 14 which is disposed on an object that can be operated by the driver of the host vehicle is connected to the ECU 12. The driver operation switch/sensor 14 is, for instance, an accelerator operation sensor which outputs a signal corresponding to an operation stroke amount or an operating force (or accelerator depression amount) of an accelerator pedal which is operated in order to accelerate the host vehicle, a pop-up switch which is displayed as a screen in a touch-operable fashion, as described below, an on/off switch which is operated so as to switch between permitting and stopping implementation of the drive power restriction control, and the like.

Operating information output from the driver operation switch/sensor 14 is input to the ECU 12. This operating information includes, at the least, information indicating the operation stroke amount or operating force of the accelerator pedal, information indicating whether or not a pop-up switch has been turned on by the driver, and information indicating whether or not an on/off switch has been turned on by the driver. The ECU 12 detects, at the least, the accelerator pedal operation stroke amount or operating force, and whether or not the pedal has been operated, on the basis of this operating information, and also respectively detects whether or not the pop-up switch has been turned on and whether or not the ON/OFF switch has been turned on.

A vehicle state sensor 16 which outputs a signal corresponding to the state of the host vehicle is connected to the ECU 12. The vehicle state sensor 16 is a vehicle speed sensor which outputs a signal corresponding to the speed of the host vehicle, or the like. Information indicating the state of the host vehicle which is output from the vehicle state sensor 16 is input to the ECU 12. This information includes, at the least, information which indicates the speed of the host vehicle. The ECU 12 detects, at the least, the speed of the host vehicle, on the basis of this information indicating the state of the host vehicle.

Furthermore, a peripheral environment sensor 18 which outputs a signal corresponding to the peripheral environment of the host vehicle is connected to the ECU 12. The peripheral environment sensor 18 is, for instance, a clearance sonar, or a radar sensor, or the like, which outputs a signal corresponding to an obstacle situated in the periphery of the host vehicle. Information indicating the peripheral environment of the host vehicle which is output from the peripheral environment sensor 18 is input to the ECU 12. This information includes, at the least, information indicating the distance to an obstacle, in a case where an obstacle is present in the periphery of the host vehicle. The ECU 12 detects, at the least, an obstacle present at a near distance from the host vehicle in the periphery of the host vehicle, or the distance to an obstacle in the periphery of the host vehicle on the basis of information indicating the peripheral environment of the host vehicle.

A plurality of the peripheral environment sensors 18 described above are provided on a vehicle body, and these sensors 18 output information indicating the respective distances to an obstacle from a plurality of locations on the host vehicle, and the ECU 12 may thereby detect an obstacle which is present at a near distance from the respective locations on the host vehicle or detect the distances to the obstacle from respective locations on the host vehicle.

An actuator 20 for causing the host vehicle to generate drive power is connected to the ECU 12. The ECU 12 calculates the drive torque which is required by the host vehicle, on the basis of the operation stroke amount or operating force of the accelerator pedal, and issues a drive request to the actuator 20 so as to adjust the fuel injection amount or intake air amount, or the ignition timing of the engine, or the amount of rotation of the motor, in order to output this drive torque. The actuator 20 adjusts the fuel injection amount, intake air amount or ignition timing of the engine, or the amount of rotation of the motor, in accordance with the drive request from the ECU 12. In this case, the required drive torque is generated in the vehicle.

In cases where an obstacle is present at a near distance in the periphery of the host vehicle (for example, within a range of 2 m or 5 m or the host vehicle), the ECU 12 also implements drive power restriction control to control the drive power that is to be generated by the host vehicle by accelerator operation by the driver, compared to normal circumstances (in other words, compared to a case where there is no obstacle at a near distance in the periphery of the host vehicle). This drive power restriction control may increase the extent of restriction for restricting the drive power as described above, as the distance from the host vehicle to the obstacle that is present at a near distance in the periphery of the host vehicle becomes shorter.

More specifically, in the drive power restriction control described above, the ECU 12 sets the drive torque which is calculated on the basis of the operation stroke amount or the operating force of the accelerator pedal, to a smaller value than in normal circumstances, and issues a drive request for outputting drive torque which is restricted in this way, to the actuator 20. In this case, the actuator 20 is driven in accordance with the drive request for restricted drive torque from the ECU 12, and therefore a drive torque which is restricted in comparison with normal circumstances is generated in the vehicle.

This drive power restriction control may involve restricting the drive power corresponding to the operation amount and operating force of the accelerator pedal in a uniform fashion throughout the whole range of the operation amount and the operating force, or may involve reducing the upper limit of the drive power to a fixed value, regardless of the operation amount and operating force of the accelerator pedal. Furthermore, the obstacle which is the object of the drive power restriction control described above is limited to an obstacle situated at no more than a prescribed distance from the host vehicle (for example, 2 m or 5 m, etc.), but the obstacle may also be limited to an obstacle that is present in the direction of travel of the host vehicle.

The ECU 12 also cancels the restriction of drive power by stopping the drive power restriction control, when the obstacle which is the object of the drive power restriction control ceases to be present after the start of the drive power restriction control as described above, and when prescribed cancellation conditions are established as described below. In a case where the drive power restriction is cancelled due to the implementation of the drive power restriction control being stopped, then the actuator 20 is subsequently driven normally in accordance with the accelerator operation, and therefore a drive torque is generated as normal.

The ECU 12 is also connected to a notification apparatus 22 for issuing a prescribed notification to the driver. The ECU 12 issues an operation request to the notification apparatus 22 so as to visually or audibly inform the driver of the fact that the drive power of the host vehicle has been restricted by the drive power restriction control or that the drive power restriction can be cancelled by an operation performed by the driver, when the drive power restriction control is to be implemented or is being implemented. The notification apparatus 22 is, for instance, an alarm device which issues a buzzer sound into the cabin, or a display panel or navigation display, etc., disposed on the instrument panel, or the like, which presents an alarm display.

The notification apparatus 22 issues a buzzer sound using the alarm device, or presents an alarm display using the display panel, in accordance with an operation request from the ECU 12. When the buzzer sound or the alarm display is issued by the notification apparatus 22, then the driver can visually or audibly tell that drive power restriction control is being implemented. Furthermore, the notification apparatus 22 causes the pop-up switch described above to be displayed so as to be touch-operable by the driver, on the display panel, in accordance with the operation request from the ECU 12. When a pop-up switch is shown on the display panel of the notification apparatus 22, the driver becomes able to touch-operate the pop-up switch on the display panel, and can thereby manually stop the implementation of the drive power restriction control.

Figure 3B:
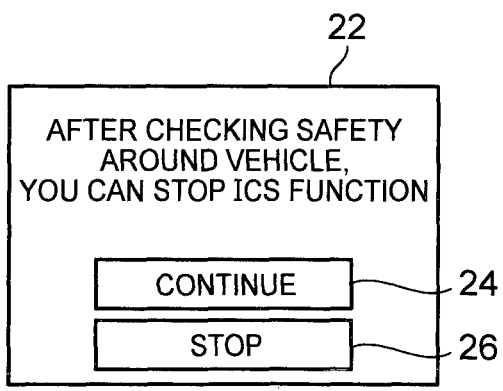

Next, an operation of cancelling drive power restriction control in the vehicle assistance control apparatus 10 according to this embodiment will be described with reference to FIG. 2 and FIG. 3. FIG. 2 shows a flowchart of one example of a control routine which is executed by the ECU 12 in controlling the display on the display panel of the notification apparatus 22, in the vehicle assistance control apparatus 10 according to this embodiment. Furthermore, FIG. 3 shows a diagram depicting one example of a display screen which is shown on the display panel of the notification apparatus 22, in the vehicle assistance control apparatus 10 according to this embodiment. FIG. 3A shows a display screen which is shown when an accelerator operation has been carried out during implementation of the drive power restriction control, and FIG. 3B shows a display screen which displays a pop-up switch, during implementation of the drive power restriction control.

In the vehicle assistance control apparatus 10 of this embodiment, the ECU 12 executes the routine shown in FIG. 2, at prescribed time intervals apart, and repeats an input process and an output process. Upon starting execution of the routine in FIG. 2, the ECU 12 determines whether the accelerator pedal is not switched on by the driver, in other words, whether or not the accelerator pedal is being kept in an off state, on the basis of the input operating information (step 100).

When, as a result of this, it is determined that the accelerator pedal is not switched on, then the ECU 12 subsequently carries out processing to increment the count value of a counter, which indicates the time during which the off state of the accelerator pedal has continued (called the "accelerator off continuation time counter" below), from the previous value (step 102). On the other hand, when it is determined that the accelerator pedal has been switched on, then the ECU 12 subsequently carries out processing to reset the count value of the accelerator off continuation time counter to zero (step 104).

When the processing in step 102 has been carried out and the processing in step 104 has been carried out, the ECU 12 then determines whether or not permission conditions which are to be established in order to implement drive power restriction control have been established (step 106). The permission conditions are previously established conditions for permitting the implementation of drive power restriction control, such as the fact that the switching on of the ON/OFF switch has been detected on the basis of the operating information, that the distance to an obstacle in the periphery of the vehicle detected on the basis of the peripheral environment information (detection distance) L is no more than a previously established prescribed distance (for example, 2 m or 5 m, etc.) L0, and furthermore that these detection results have stabilized, and so on.

When these permission conditions are not established, then a normal drive command is issued to the actuator 20 from the ECU 12, whereby a normal drive power is generated in accordance with the accelerator operation. On the other hand, when the permission conditions described above are established, then a drive instruction which restricts the drive power is issued to the actuator 20 from the ECU 12, whereby the driven power based on the accelerator operation is generated at a restricted level compared to normal circumstances. When the drive power of the vehicle is restricted, then the acceleration of the vehicle is limited with respect to the accelerator operation by the driver, and therefore it is possible to suppress collision of the host vehicle with an obstacle that is situated at a near distance from the host vehicle.

When it has been determined that the permission conditions described above have been established, the ECU 12 then determines whether or not all of the following have been established: the distance to an obstacle in the periphery of the automobile detected on the basis of the peripheral environment information (detection distance) L is no more than the prescribed distance L1, switching on of the accelerator pedal is detected on the basis of the operating information, and drive power restriction control is currently being implemented using the actuator 20 (step 108).

The prescribed distance L1 may be set to the maximum value of the distance at which it can be determined that there is a possibility that an obstacle detected using the peripheral environment sensor 18 is attached material which is attached to the lens surface, or the like, of the peripheral environment sensor 18, and may be set in advance to a value of 30 cm or 50 cm, etc., for example, which is equal to or less than a prescribed distance (for example, 2 m or 5 m) L0 set as a boundary value between implementation and non-implementation of the drive power restriction control.

As a result of this, when the detection distance L from the host vehicle to the obstacle is equal to or less than the prescribed distance L1, and switching on the accelerator pedal is detected, and it is determined that drive power restriction control is currently being implemented, then an operation request to the display panel of the notification apparatus 22 is subsequently switched on in order to display an indication that drive power restriction control is being implemented, in other words, that the drive power of the host vehicle is being restricted in relation to the accelerator operation (step 110).

The operation request in step 110 described above informs the driver that drive power restriction control is being implemented, in order that the driver checks for an obstacle in the periphery of the host vehicle or checks the sensor surface of the peripheral environment sensor 18, and the like, because in cases where an affirmative determination is made in step 108 described above, it can be determined that the driver is seeking to accelerate the host vehicle while drive power restriction control is being implemented to restrict the drive power in the host vehicle, in circumstances where there is a possibility that adhering matter has been detected as an obstacle at a near distance. In other words, under circumstances where there is virtually no possibility that the obstacle at a near distance is adhering matter, or circumstances where drive power restriction control is not currently being implemented, or circumstances where the driver is not seeking to accelerate the host vehicle by an accelerator operation, then there is little need for the driver to check for obstacles in the periphery of the host vehicle or to check the sensor surface, etc. of the peripheral environment sensor 18, and the operation request described above is not carried out.

The ECU 12 then makes the determination indicated below, when an operation request for a display indicating that drive power restriction control is being implemented is switched on to the display panel of the notification apparatus 22 in step 110, and when the detection distance L is greater than the prescribed distance L1 in step 108, and a switching on operation of the accelerator pedal is not detected or drive power restriction control is not currently being implemented (step 112).

More specifically, the ECU 12 determines whether or not all of these conditions are established: the count value of the accelerator off continuation time counter incremented in step 102 is no less than a prescribed time which is established previously (for example, 5 seconds), the detection distance L to an obstacle detected on the basis of the peripheral environment information is no more than the prescribed distance L1, the speed of the host vehicle detected on the basis of the vehicle state information is no more than a prescribed value which corresponds to a halted state (in other words, substantially zero), and an operation request for a display indicating that drive power restriction control is being implemented is switched on to the display panel of the notification apparatus 22 in step 110. This step 112 serves to determine the establishment or non-establishment of conditions that are to be established in order to permit the driver to carry out a cancelling operation for cancelling restriction of drive power by stopping implementation of drive power control.

As a result of this, when the count value of the accelerator off continuation time counter is equal to or greater than the prescribed time, and the detection distance L from the host vehicle to the obstacle is no more than the prescribed distance L1, and the speed of the host vehicle is no more than a prescribed value, and it is determined that an operation request for a display indicating that drive power restriction control is being implemented has been switched on, then subsequently, an operation request to the display panel of the notification apparatus 22 is switched on in such a manner that, instead of the display indicating that the drive power restriction control is being implemented, a display is issued to indicate that the drive power restriction currently being implemented by the drive power restriction control can be cancelled by an operation performed by the driver, as well as displaying a touch-operable switch for the purpose of this cancelling operation (step 114). The operation request in step 114 serves to inform the driver that he or she can cancel drive power restriction, and also to enable the pop-up switch for the purpose of this cancelling operation to be touch-operated.

When the ECU 12 determines that the permission conditions relating to drive power restriction control are not established in step 106, the ECU 12 then switches off the operation request to the display panel of the notification apparatus 22, so as to switch off the display indicating that the drive power restriction control is being implemented, the display indicating that the drive power restriction can be cancelled, and the display of the pop-up switch (step 116).

In cases where the count value of the accelerator off continuation time counter is less than the prescribed value in step 112, and the detection distance L from the host vehicle to the obstacle is greater than the prescribed distance L1, and the host vehicle speed is greater than a prescribed value or it is determined that an operation request for a display indicating that drive power restriction control is being implemented has not been turned on, and in cases where the display indicating that drive power restriction control is being implemented has been switched off on the display panel of the notification apparatus 22 in step 114, and an operation request to switch on a display enabling cancellation of the drive power restriction has been turned on, and in cases where the operation request to switch on a display indicating that drive power restriction control is being implemented on the display panel of the notification apparatus 22 in step 116, and the operation request to turn on a display enabling cancellation of the drive power restriction, have both been turned off, then the ECU 12 carries out arbitration processing between the display requests in steps 112, 114, and 116 (step 118) and carries out display output processing to the display panel of the notification apparatus 22.

According to the routine shown in FIG. 2, when an accelerator operation is performed in a state where there is a possibility that the obstacle that is the object of drive power restriction control is adhering material, while implementing drive power restriction control as a result of the detection of an obstacle present at a near distance from the host vehicle, then it is possible to display, on the display panel of the notification apparatus 22, an indication that drive power restriction control is being implemented due to the detection of an obstacle. For example, it is possible to issue a reminder display or a warning display, such as "Cannot accelerate because an obstacle has been detected. Stop the vehicle in a safe place and check the sonar.", as depicted FIG. 3A.

When a display of this kind is issued, then the driver of the host vehicle is able to tell that drive power restriction control is being implemented as a result of the detection of an obstacle at the host vehicle, by looking at the contents shown on the display panel of the notification apparatus 22, and the driver is also prompted to halt the host vehicle and check the state of the peripheral environment sensor 18 (for example, whether or not dirt or snow, etc. is adhering thereto), when the driver has not been able to see any obstacle that might be an object of the drive power restriction control, in the periphery of the host vehicle. In this respect, according to this embodiment, in cases where an accelerator operation is carried out while drive power restriction control is being implemented as a result of an obstacle which has a possibility of being adhering material, it is possible to make the driver of the host vehicle recognize that the vehicle cannot be accelerated in accordance with the accelerator operation, while drive power restriction control is being implemented, and it is also possible to prompt the driver to halt the vehicle in order to check whether or not there is adhering material on the peripheral environment sensor 18, and so on.

Furthermore, according to the routine shown in FIG. 2 described above, in cases where, after drive power restriction control has been started and a display indicating that drive power restriction control is being implemented has been started, the detection distance L from the host vehicle to the obstacle is equal to or less than the prescribed distance L1 while issuing a display request for an indication that the drive power restriction control is being implemented, but an off state of the accelerator pedal continues for a long period of time, and the speed of the host vehicle is substantially zero, then instead of issuing a display indicating that drive power restriction control is being implemented as a result of the detection of an obstacle, an indication that the drive power restriction can be cancelled by an operation performed by the driver is displayed on the display panel of the notification apparatus 22, and a pop-up switch for performing this cancelling operation can be displayed in a touch-operable fashion.

For example, it is possible to issue a reminder display and a warning display such as "After checking safety around the vehicle, you can stop drive power restriction control.", and to show a display of pop-up switches 24, 26, such as "Continue" and "Stop", which can be touch-operated. The pop-up switch 24 indicated as "Continue" causes the drive power restriction control to be continued when touch-operated, as well as terminating the display indicating that drive power restriction can be cancelled, and terminating the display of the pop-up switches 24, 26. Furthermore, the pop-up switch 26 indicated as "Stop" cancels the drive power restriction control when touch-operated, as well as terminating the display indicating that drive power restriction can be cancelled, and terminating the display of the pop-up switches 24, 26. Furthermore, the cancellation of the drive power restriction control by touch operation of the pop-up switch 26 may be a temporary operation for the period of time from a vehicle speed of zero until reaching a prescribed speed, or a period of time from the touch operation until a prescribed time has elapsed, or the like.

When an off state of the accelerator pedal continues for a prescribed period of time and a host vehicle speed of substantially zero is established, then it can be inferred that, after issuing a display indicating that drive power restriction control is being implemented as a result of the detection of an obstacle, this display has been viewed by the driver, who has halted the host vehicle intentionally. There is little need to implement drive power restriction control while the vehicle is halted, and it is convenient if the drive power restriction based on the detection of an obstacle can be cancelled at the wish of the driver, after the driver has checked the state of the peripheral environment sensor 18, and the like, while the vehicle is halted.

When a display indicating that the drive power restriction can be cancelled by an operation performed by the driver and a display of pop-up switches are issued, then by looking at the contents on the display panel of the notification apparatus 22, the driver of the host vehicle is able to tell that the drive power restriction by drive power restriction control can be cancelled by an operation performed by the driver, as well as being able to carry out a touch operation of the pop-up switches to select whether or not to cancel the drive power restriction. When a touch operation which instructs cancellation of the drive power restriction is performed via this pop-up switch, the implementation of the drive power restriction control is subsequently stopped and the restriction of drive power in relation to an accelerator operation is cancelled, and therefore it is possible to cause the vehicle to generate strong torque, as normal, by the accelerator operation.

In this way, according to this embodiment, in a case where the host vehicle speed is substantially zero during implementation of the drive power restriction control as a result of an obstacle which has the possibility of being adhering material, and an off state of the accelerator pedal continues for a long period of time, then it is possible to enable the implementation of the drive power restriction control to be stopped by a cancelling operation performed by the driver, thus enabling cancellation of the drive power control. In other words, for example, after drive power restriction control has been started as a result of adhering material such as mud or snow, etc. adhering to the lens surface, or the like, of the peripheral environment sensor 18, or erroneous detection by the peripheral environment sensor 18, or the like, the driver is able to stop implementation of the drive power restriction control by continuing an off state of the accelerator pedal for a long period of time and halting the host vehicle, and then checking for problems such as adhering material on the peripheral environment sensor 18, erroneous detection by the peripheral environment sensor 18, and the like, and then touch-operating the pop-up switch for cancellation which is displayed on the display panel.

Consequently, according to this embodiment, it is possible, by a touch operation performed by the driver on the pop-up switch, to stop drive power restriction control that has been started due to adhering material which is adhering to the peripheral environment sensor 18 or due to erroneous detection of an obstacle by the peripheral environment sensor 18, or the like. In this respect, it is possible to cancel the drive power control reliably at the wish of the driver, in circumstances where drive power restriction is not to be implemented in the host vehicle, such as when adhering material is adhering to the peripheral environment sensor 18 and when the peripheral environment sensor 18 has erroneously detected an obstacle, or the like, and hence the host vehicle can be accelerated as normal in accordance with the accelerator operation performed by the driver, and the acceleration performance can be guaranteed.

In the first embodiment described above, an obstacle present at a near distance from the host vehicle (in other words, an obstacle of which the distance L from the host vehicle is equal to or less than the prescribed distance L0 (more specifically, an obstacle at a distance L from the host vehicle that is no more than the prescribed distance L1)) corresponds to the "prescribed obstacle" set forth in the claims. Moreover, the "obstacle detection means" set forth in the claims is achieved by the ECU 12 detecting an obstacle of which the distance L from the host vehicle is equal to or less than the prescribed distance L0, by using the peripheral environment sensor 18 (more specifically, an obstacle of which the distance L from the host vehicle is equal to or less than the prescribed distance L1), the "drive power restriction means" set forth in the claims is achieved by the ECU 12 restricting the drive power that is to be generated by the host vehicle by an accelerator operation performed by the driver, when an obstacle is detected, compared to when an obstacle is not detected, the "host vehicle speed detection means" set forth in the claims is achieved by the ECU 12 detecting the speed of the host vehicle by using the vehicle state sensor 16, and the "accelerator operation detection means" set forth in the claims is achieved by the ECU 12 detecting the presence or absence of operation of the accelerator pedal by using the driver operation switch/sensor 14.

Moreover, the "cancellation means" set forth in the claims is achieved by the ECU 12 switching on an operation request to display a pop-up switch for cancelling drive power restriction on the display panel of the notification apparatus 22, in a touch-operable fashion, in cases where, while implementing drive power restriction control and issuing a display indicating this implementation, the count value of the accelerator off continuation time counter indicates a value equal to or greater than a prescribed time, the detection distance L to the obstacle is equal to or less than the prescribed distance L1, and the host vehicle speed is equal to or less than the prescribed value, and the "notification means" and "display means" set forth in the claims are achieved by the display panel of the notification apparatus 22 displaying an indication that drive power restriction control is being implemented in accordance with an on operation request from the ECU 12, when the detection distance L to the obstacle is equal to or less than the prescribed distance L1, and an on operation of the accelerator pedal is detected, and drive power restriction control is currently being implemented, as well as displaying a pop-up switch for cancelling the drive power restriction, in a touch-operable fashion, in accordance with an on operation request from the ECU 12, when the count value of the accelerator off continuation time counter indicates a value equal to or greater than the prescribed period of time during implementation of drive power restriction control, and the detection distance L to the obstacle is equal to or less than the prescribed distance L1, and the host vehicle speed is equal to or less than the prescribed value.

Figure 4:
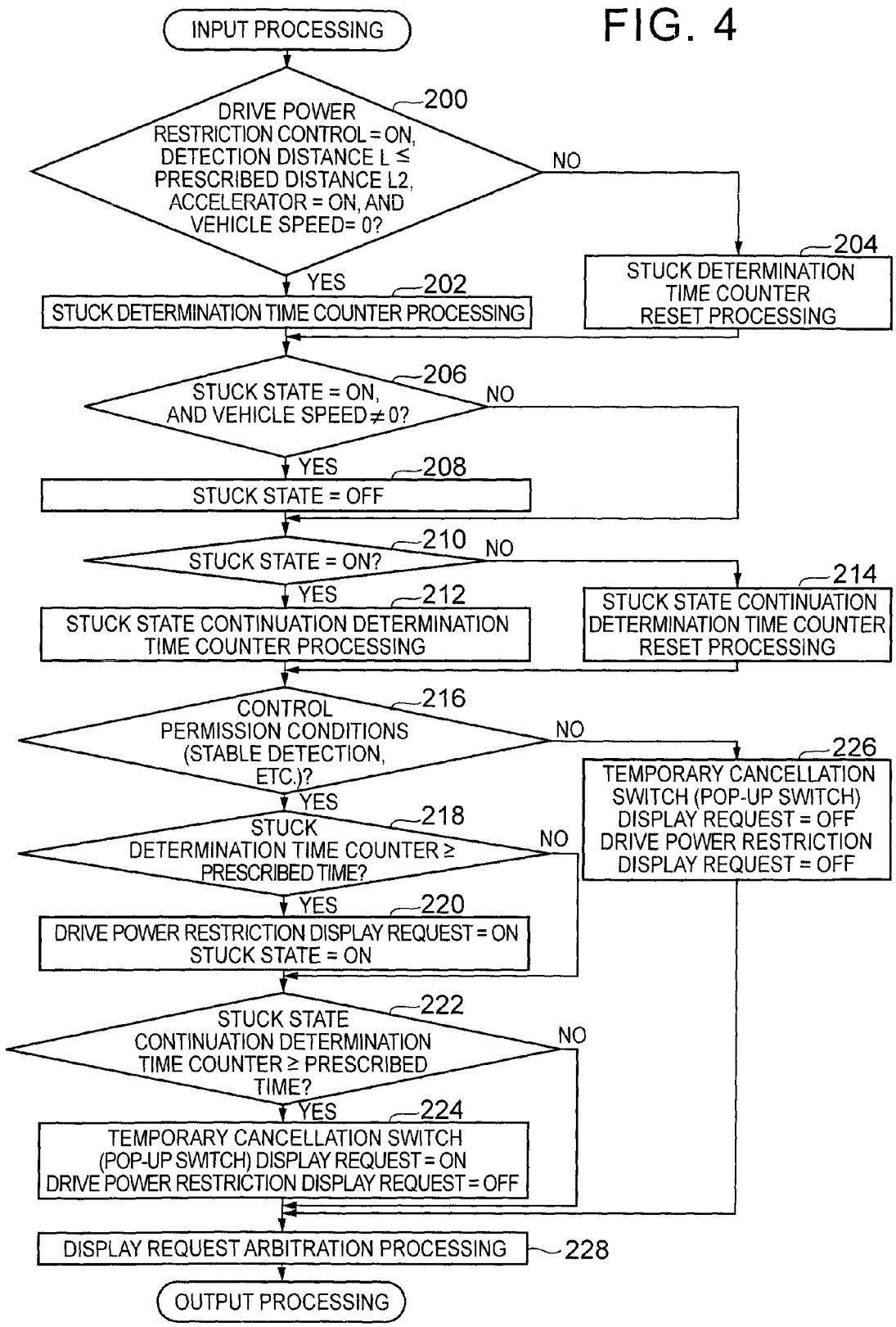
FIG. 4 is a flowchart of one example of a control routine which is executed in controlling the display on a display panel in a vehicle assistance control apparatus according to a second embodiment of this invention.

The vehicle assistance control apparatus 10 which is a second embodiment of the invention is achieved by the ECU 12 executing the routine shown in FIG. 4, instead of the routine shown in FIG. 2. FIG. 4 shows a flowchart of one example of a control routine which is executed by the ECU 12 in controlling the display on the display panel of the notification apparatus 22, in the vehicle assistance control apparatus 10 according to this embodiment.

In the vehicle assistance control apparatus 10 of this embodiment, the ECU 12 executes the routine shown in FIG. 4, at prescribed time intervals apart, and repeats an input process and an output process. When execution of the routine shown in FIG. 4 is started, the ECU 12 firstly determines whether or not all of the following conditions are established: the drive power restriction control is currently being implemented by using the actuator 20, the detection distance L to an obstacle in the periphery of the host vehicle as detected on the basis of the peripheral environment information is equal to or less than the prescribed distance L2, a switching on operation of the accelerator pedal has been detected on the basis of the operating information, and the speed of the host vehicle as detected on the basis of vehicle state information is equal to or less than a prescribed value corresponding to a stationary vehicle (more specifically, the speed is substantially zero) (step 200).

In this embodiment, the drive power restriction control varies the extent of restriction by which the drive power that is to be generated in the host vehicle by an accelerator operation is restricted in comparison with when an obstacle is not detected, in accordance with the distance to an obstacle present at a near distance from the host vehicle in the periphery of the host vehicle, and more specifically, the extent of restriction by which the drive power is restricted compared to when an obstacle is not detected is increased as the distance to the obstacle becomes shorter.

The prescribed distance L2 may be set to the maximum value of the distance at which it can be determined that there is a possibility of the host vehicle not being able to exit from a stuck state as described below, as a result of implementing the drive power restriction control, and may be set in advance to a value of 1 m or 1.5 m, for instance, which is equal to or lower than the prescribed distance (for example, 2 m or 5 m) L0 that is the boundary value between implementation and non-implementation of drive power restriction control, and which indicates a boundary value between a high and low extent of restriction in the drive power restriction.

Step 200 described above serves to determine whether or not there is a possibility of the host vehicle falling into a situation (called a "stuck state" below) in which the vehicle has difficulty in moving over or out from a step or hole, due to insufficient drive power, with the restricted drive power that is generated by the vehicle, for instance, when there is a large step in the direction of travel of the vehicle or when the vehicle tires have entered into a hole in the road, or the like, while drive power restriction control is being implemented on the basis of the detection of an obstacle.

As a result of this, in a case where drive power restriction control is currently being implemented, and the detection distance L from the host vehicle to the obstacle is equal to or less than the prescribed distance L2, and an on operation of the accelerator pedal is detected, and it is determined that the speed of the host vehicle is equal to or less than the prescribed value, then processing is subsequently carried out to increment the count value of a counter which indicates the continuous time during which the conditions are established in step 200, which is used in order to determine that the host vehicle is in a stuck state (this counter is called the "stuck determination time counter" below), from the previous value (step 202). On the other hand, in a case where the drive power restriction control is not currently being implemented, and the detection distance L from the host vehicle to the obstacle is greater than the prescribed distance L2, and an on operation of the accelerator pedal is not detected or it is determined that the host vehicle speed is greater than a prescribed value, then processing is subsequently carried out to reset the count value of the stuck determination time counter to zero (step 204).

When the processing in step 202 has been carried out and the processing in step 204 has been carried out, then the ECU 12 subsequently determines whether or not all of the following conditions have been established: that the host vehicle is in a stuck state and that the speed of the host vehicle is greater than the prescribed value (in other words, is not zero) (step 206). As a result of this, in a case where the host vehicle is in a stuck state and the speed of the host vehicle is greater than a prescribed value, then it is determined that the state of the host vehicle has changed from a stuck state to a non-stuck state (step 208).

When the host vehicle is determined to be in a non-stuck state or the host vehicle speed is determined to be equal to or less than the prescribed value in step 206, or when the host vehicle is determined to have assumed a non-stuck state in step 208, then the ECU 12 subsequently determines whether or not the host vehicle is in a stuck state (step 210). When, as a result of this, it is determined that the host vehicle is in a stuck state, then the ECU 12 subsequently carries out processing to increment the count value of a counter which indicates the time during which the stuck state of the host vehicle has continued (called the "stuck state continuation determination counter" below), from the previous value (step 212). On the other hand, when it is determined that the host vehicle is not in a stuck state, in other words, is in a non-stuck state, then the ECU 12 subsequently carries out processing to reset the count value of the stuck state continuation determination time counter to zero (step 214).

When the processing in step 212 has been carried out and the processing in step 214 has been carried out, the ECU 12 then determines whether or not permission conditions which are to be established in order to implement the drive power restriction control have been established (step 216). The permission conditions are previously established conditions for permitting the implementation of drive power restriction control, such as the fact that switching on of the ON/OFF switch has been detected on the basis of the operating information, that the distance to an obstacle in the periphery of the vehicle detected on the basis of the peripheral environment information (detection distance) L is equal to or less than a previously established prescribed distance (for example, 2 m or 5 m, etc.) L0, and furthermore that these detection results have stabilized, etc.

When these permission conditions are not established, then a normal drive command is issued to the actuator 20 from the ECU 12, whereby a normal drive power is generated in accordance with the accelerator operation. On the other hand, when the permission conditions described above are established, then a drive instruction which restricts the drive power is issued to the actuator 20 from the ECU 12, whereby the drive power based on the accelerator operation is generated at a restricted level compared to normal circumstances. When the drive power of the vehicle is restricted, then the acceleration of the vehicle is limited with respect to the accelerator operation by the driver, and therefore it is possible to suppress collision of the host vehicle with an obstacle that is situated at a near distance from the host vehicle.

When it is determined that the abovementioned permission conditions are established, then the ECU 12 subsequently determines whether or not the count value of the stuck determination time counter which is incremented in step 202 described above is equal to or greater than the previously established prescribed time (three seconds, for example) (step 218). In a case where it is determined that the count value of the stuck determination time counter is indicating a prescribed time or longer, the ECU 12 then switches on an operation request to the display panel of the notification apparatus 22 in such a manner that an indication that drive power restriction control is being implemented, in other words, an indication that the drive power of the host vehicle is being restricted with respect to an accelerator operation, is displayed (step 220).

In this respect, in this embodiment, the determination that the host vehicle is in a stuck state in step 220 is continued from carrying out the processing in step 220 until carrying out the processing in step 208. More specifically, the stuck state continues from when it is detected that an accelerator operation is being performed and the host vehicle speed has started to be equal to or lower than the prescribed value, until the host vehicle speed subsequently becomes greater than the prescribed value regardless of whether or not there is an accelerator operation.

In a case where it is determined in step 218 that the count value of the stuck determination time counter is less than a prescribed time and a case where the operation request for a display indicating that drive power restriction control is being implemented is turned on in step 220 and it is determined that the host vehicle is in a stuck state, then the ECU 12 determines whether or not the count value of the stuck state continuation determination time counter indicates a value equal to or greater than a previously established prescribed time (this prescribed time may be different from the prescribed time in the stuck determination time counter, and is set to, for example, 3 seconds or 5 seconds) (step 222).

When the count value of the stuck state continuation determination time counter is determined to indicate a value equal to or greater than the prescribed time, then the ECU 12 subsequently switches on an operation request to the display panel of the notification apparatus 22 so as to display, instead of an indication that drive power restriction control is being implemented, an indication that the drive power restriction currently being implemented by drive power restriction control can be cancelled by an operation performed by the driver, and to display a pop-up switch that is touch-operated in order to perform this cancelling operation (step 224). The operation request in step 224 is in order to inform the driver that the driver can cancel drive power restriction, and in order to touch-operate the pop-up switch for the purpose of this cancelling operation.

When the ECU 12 determines that the permission conditions relating to drive power restriction control are not established in step 216, the ECU 12 then turns off the operation request to the display panel of the notification apparatus 22, so as to switch off the display indicating that the drive power restriction control is being implemented, the display indicating that the drive power restriction can be cancelled, and the display of the pop-up switch (step 226).

In a case where it is determined that the count value of the stuck state continuation determination time counter is less than the prescribed time in step 222, a case where an operation request is turned on to switch off the display indicating that drive power restriction control is being implemented on the display panel of the notification apparatus 22 and to switch on a display enabling cancellation of the drive power restriction in step 224, and a case where an operation request to switch on a display indicating that drive power restriction control is being implemented on the display panel of the notification apparatus 22 and an operation request to switch on a display enabling cancellation of the drive power restriction are both turned off in step 226, the ECU 12 carries out an arbitration process of the display requests in steps 222, 224 and 226 (step 228), and then carries out display output processing to the display panel of the notification apparatus 22.

According to the routine shown in FIG. 4 described above, in a case where drive power restriction control is being implemented as a result of the detection of an obstacle present at a near distance from the host vehicle and the extent of restriction of the drive power restriction due to the drive power restriction control is relatively high, and where the vehicle speed continues to remain at or below a prescribed value (more specifically, substantially zero) for a long period of time, despite the fact that an accelerator operation is being performed, then it is determined that the host vehicle is in a stuck state, and furthermore an indication that drive power restriction control is being implemented as a result of the detection of an obstacle can be displayed on the display panel of the notification apparatus 22. This display may be, for instance, a reminder display or a warning display, such as "Vehicle stuck. Insufficient acceleration due to detected obstacle."

When this display is issued, the driver of the host vehicle can tell that the host vehicle is stuck and that drive power restriction control is being implemented in the host vehicle as a result of the detection of an obstacle, by looking at the contents on the display panel of the notification apparatus 22. In this respect, according to this embodiment, when the host vehicle is stuck during implementation of drive power restriction control, the driver of the host vehicle is able to recognize that there is a possibility of the host vehicle falling into a situation where the vehicle cannot exit from the stuck state due to insufficient drive power, with the drive power that has been restricted by drive power restriction control.

Furthermore, according to the routine shown in FIG. 4 described above, in a case where drive power restriction control having a relatively high extent of restriction of the drive power restriction is being implemented, and an indication that drive power restriction control is being implemented is displayed, and where the host vehicle continues in a stuck state for a long period of time, then it is possible to display, on the display panel of the notification apparatus 22, an indication that the drive power restriction can be cancelled by an operation performed by the driver, instead of an indication that drive power restriction control as a result of the detection of an obstacle is being implemented, and a pop-up switch, displayed in a touch-operable fashion, for the purpose of performing this cancelling operation.

The display described above may be, for instance, a reminder display and a warning display, such as "Vehicle has continued in a stuck state for a long time. Driver power restriction control can be stopped.", and touch-operable pop-up switches such as "Continue" and "Stop", and the like. The pop-up switch indicated as "Continue" causes the drive power restriction control to be continued when touch-operated, as well as ending the display indicating that drive power restriction can be cancelled, and ending the display of all of the pop-up switches. Furthermore, the pop-up switch indicated as "Stop" cancels the implementation of drive power restriction control when touch-operated, as well as ending the display indicating that drive power restriction can be cancelled, and ending the display of the pop-up switches. Furthermore, the cancellation of the drive power restriction control by touch operation of the pop-up switch indicating "Stop" may be a temporary operation for the period of time from a vehicle speed of zero until reaching a prescribed speed, or a period of time from the touch operation until a prescribed time has elapsed, or the like.

When the vehicle continues in a stuck state with a vehicle speed of substantially zero for a long period of time, despite the fact that an accelerator operation is being performed, then it can be inferred that the vehicle cannot exit from the stuck state, and that the driver is continuing an accelerator operation in order to exit from the stuck state. On the other hand, in order to make the vehicle exit from the stuck state when the vehicle has fallen into a stuck state during implementation of a drive power restriction control having a relatively high extent of restriction of the drive power restriction, it is effective to cancel the drive power restriction by stopping the implementation of drive power restriction control.

When a display indicating that the drive power restriction can be cancelled by an operation performed by the driver and a display of pop-up switches are issued, then by looking at the contents on the display panel of the notification apparatus 22, the driver of the host vehicle is able to tell that the drive power restriction by drive power restriction control can be cancelled by an operation performed by the driver, as well as being able to carry out a touch operation of the pop-up switches to select whether or not to cancel the drive power restriction. When a touch operation which instructs cancellation of the drive power restriction is issued via this pop-up switch, the implementation of the drive power restriction control is subsequently stopped and the restriction of drive power in relation to the accelerator operation is cancelled, and therefore it is possible to cause the vehicle to generate strong torque, as normal, by the accelerator operation.

In this way, according to this embodiment, in a case where the vehicle continues for a long time in a stuck state during implementation of drive power restriction control having a relatively high extent of restriction of the drive power restriction, it is possible to enable cancellation of the drive power restriction by enabling the implementation of drive power restriction control to be stopped by a cancelling operation performed by the driver. In other words, it is possible to stop implementation of the drive power restriction control by the driver performing a touch operation of the pop-up switch for cancellation which is displayed on the display panel of the notification apparatus 22.

Consequently, according to this embodiment, it is possible to stop the drive power restriction control by a touch operation performed by the driver on the pop-up switch, when a stuck state of the vehicle has continued for a long period of time while drive power restriction control is being implemented. In this respect, it is possible to cancel the drive power restriction reliably at the wish of the driver, in a situation where the drive power restriction is not to be implemented in the host vehicle, for instance, when a stuck state of the vehicle cannot be resolved due to insufficient drive power, with the drive power that has been restricted by the drive power restriction control, and it is possible to generate torque as normal in the host vehicle in accordance with the accelerator operation performed by the driver, so as to exit easily from the stuck state.

Furthermore, in this embodiment, the fact that the stuck state has continued for a long period of time is set as a condition in order to display, in a touch-operable fashion, a pop-up switch for cancelling drive power restriction, on the display panel of the notification apparatus 22, after the vehicle has fallen into a stuck state temporarily during implementation of the drive power restriction control. As described above, the stuck state of the vehicle continues from when it is detected that an accelerator operation is being performed and the host vehicle speed has started to be equal to or lower than the prescribed value, until the host vehicle speed subsequently becomes greater than the prescribed value regardless of whether or not there is an accelerator operation. In this respect, according to this embodiment, it is not necessary for the driver to continue an accelerator operation for a long period of time in order to display, in a touch-operable fashion, a pop-up switch for cancelling the drive power restriction on the display panel of the notification apparatus 22, when the vehicle has fallen temporarily into a stuck state during implementation of drive power restriction control, and therefore cancellation of the drive power restriction in the event of a stuck state is achieved by simple means, and the host vehicle can be made to exit from the stuck state.

In the second embodiment, an obstacle present at a near distance from the host vehicle (in other words, an obstacle which is at a distance L from the host vehicle that is equal to or less than the prescribed distance L0 (more specifically, an obstacle of which the distance L from the host vehicle is no more than the prescribed distance L1)) corresponds to the "prescribed obstacle" set forth in the claims. Moreover, the "obstacle detection means" set forth in the claims is achieved by the ECU 12 detecting an obstacle of which the distance L from the host vehicle is equal to or less than the prescribed distance L0, (more specifically, an obstacle of which the distance L from the host vehicle is equal to or less than the prescribed distance L1), by using the peripheral environment sensor 18, the "drive power restriction means" set forth in the claims is achieved by the ECU 12 restricting the drive power that is to be generated by the host vehicle by an accelerator operation performed by the driver, when an obstacle is detected, compared to when an obstacle is not detected, the "accelerator operation detection means" set forth in the claims is achieved by the ECU 12 detecting the presence or absence of operation of the accelerator pedal by using the driver operation switch/sensor 14, and the "host vehicle speed detection means" set forth in the claims is achieved by the ECU 12 detecting the speed of the host vehicle by using the vehicle state sensor 16.

Furthermore, the "stuck state determination means" set forth in the claims is achieved by the ECU 12 determining that the host vehicle is continuing in a stuck state from when it is determined that the host vehicle is in a stuck state in step 220 in the routine shown in FIG. 4, until it is determined that the host vehicle has changed from a stuck state to a non-stuck state in step 208, and the "cancellation means" set forth in the claims is achieved by the ECU 12 turning on an operation request to display, in a touch-operable fashion, a pop-up switch for cancelling drive power restriction on the display panel of the notification apparatus 22, when a stuck state of the host vehicle has continued for a prescribed period of time during implementation of drive power restriction control.

Furthermore, in the second embodiment described above, stopping of execution of the drive power restriction control by a cancelling operation performed by the driver is enabled so as to enable cancellation of drive power restriction, in cases where a display indicating that drive power restriction control is being implemented is displayed and the host vehicle has continued in a stuck state for a long period of time. However, the invention is not limited to this, and it is also possible to enable the extent of restriction of the drive power restriction in the drive power restriction control to be set to a low extent compared to the normal extent of restriction in accordance with the distance to the obstacle, in cases where a display indicating that drive power restriction control is being implemented is displayed and the host vehicle has continued in a stuck state for a long period of time. In this modification example also, the drive power restriction based on the drive power restriction control is limited to a lesser restriction than normal, and therefore the host vehicle can be made to exit more readily from the stuck state.

Furthermore, in the second embodiment described above, in the drive power restriction control, the extent of restriction by which the drive power to be generated in the host vehicle in accordance with an accelerator operation is restricted in comparison with when no obstacle is detected, is varied in accordance with the distance from the host vehicle to the obstacle which is present at a near distance, and stopping of the implementation of drive power restriction control by a cancelling operation performed by the driver is enabled, thereby enabling the cancellation of drive power restriction, in cases where a display indicating that drive power restriction control is being implemented is displayed and the host vehicle has continued in a stuck state for a long period of time, when implementing drive power restriction control having a relatively high extent of restriction of the drive power restriction in the vehicle. However, the invention is not limited to this, and it is also possible to implement and stop the drive power restriction control in accordance with the distance from the host vehicle to the obstacle, and to enable stopping of the implementation of the drive power restriction control by a cancelling operation performed by the driver, thereby enabling cancellation of the drive power restriction, in cases where a display indicating that drive power restriction control is being implemented is displayed and the host vehicle has continued in a stuck state for a long period of time, when implementing drive power restriction control.

In the first and second embodiments described above, the driver is informed visually of the fact that drive power restriction control is being implemented, by displaying an indication that drive power restriction control is currently being implemented, on the display panel of the notification apparatus 22. However, the invention is not limited to this, and it is also possible to use an audible indication from a speaker issuing an audio output, as a method for informing the driver of the fact that drive power restriction control is being implemented, in addition to or instead of a visual indication via the display panel of the notification apparatus 22.

Furthermore, in the first and second embodiments described above, a decision to "Continue" or "Stop", etc. is made by touch-operation of a pop-up switch which is displayed on the display panel of the notification apparatus 22. However, the invention is not limited to this, and the operating method may also employ a method involving selection by cursor of the options "Continue" or "Stop", etc. using hardware switches disposed on the steering wheel (achieved, for example, by cross-keys for selecting an item and an enter key for confirming the selection, and the like).

The invention claimed is:

1. A vehicle assistance control apparatus, comprising:
   obstacle detection means for detecting a prescribed obstacle in a periphery of a host vehicle;
   host vehicle speed detection means for detecting a speed of the host vehicle;
   accelerator operation detection means for detecting presence or absence of an accelerator operation;
   drive power restriction means for restricting, when the prescribed obstacle is detected by the obstacle detection means, a drive power that is to be generated in the host vehicle by an accelerator operation performed by a driver, compared to when the prescribed obstacle is not detected; and
   cancellation means for enabling cancellation of restriction of the drive power by the drive power restriction means by a cancelling operation performed by the driver, when the speed detected by the host vehicle speed detection means is equal to or lower than a prescribed value and when a state where the accelerator operation detection means detects that the accelerator operation is not being performed has continued for a prescribed period of time or longer.

2. The vehicle assistance control apparatus according to claim 1, further comprising:
   notification means for visually or audibly notifying that the drive power is being restricted, when the drive power is being restricted by the drive power restriction means.

3. The vehicle assistance control apparatus according to claim 2, wherein the notification means includes display means for issuing a warning display indicating that the drive power is being restricted by the drive power restriction means.

4. The vehicle assistance control apparatus according to claim 3, wherein the display means also issues a display of a cancellation switch for use in the cancelling operation, when the speed detected by the host vehicle speed detection means is equal to or lower than the prescribed value, and when the state where the accelerator operation detection means detects that the accelerator operation is not being performed has continued for the prescribed period of time or longer, after starting the warning display.

5. The vehicle assistance control apparatus according to claim 4, wherein the display means issues the display of the cancellation switch instead of the warning display, when the speed detected by the host vehicle speed detection means is equal to or lower than the prescribed value, and when the state where the accelerator operation detection means detects that the accelerator operation is not being performed has continued for the prescribed period of time or longer, after starting the warning display.

6. The vehicle assistance control apparatus according to claim 1, wherein the drive power restriction means also increases an extent of restriction by which the drive power is restricted, as a distance from the host vehicle to the prescribed obstacle detected by the obstacle detection means becomes shorter.

7. A vehicle assistance control apparatus, comprising:
   obstacle detection means for detecting a prescribed obstacle in a periphery of a host vehicle;
   accelerator operation detection means for detecting presence or absence of an accelerator operation;
   host vehicle speed detection means for detecting a speed of the host vehicle;
   drive power restriction means for restricting, when the prescribed obstacle is detected by the obstacle detection means, a drive power that is to be generated in the host vehicle by an accelerator operation performed by a driver, compared to when the prescribed obstacle is not detected;
   stuck state determination means for determining that the host vehicle is stuck, from when the accelerator operation detection means detects that the accelerator operation is being performed and the speed detected by the host vehicle speed detection means starts to be equal to or lower than a prescribed value, until the speed becomes greater than the prescribed value; and
   cancellation means for enabling cancellation of the restriction of the drive power by the drive power restriction means by a cancelling operation performed by the driver, when a state where the stuck state determination means determines that the host vehicle is stuck has continued for a prescribed period of time or longer.

8. A vehicle assistance control apparatus, comprising:
   an obstacle detection sensor that detects a prescribed obstacle in a periphery of a host vehicle;
   a host vehicle speed detection sensor that detects a speed of the host vehicle;
   an accelerator operation detection sensor that detects whether an accelerator operation is performed; and
   an electronic controller configured to:
   restrict, when the prescribed obstacle is detected by the obstacle detection sensor, a drive power that is to be generated in the host vehicle by an accelerator operation performed by a driver, compared to when the prescribed obstacle is not detected; and
   enable cancellation of the restriction of the drive power by a cancelling operation performed by the driver, when the speed detected by the host vehicle speed detection sensor is equal to or lower than a prescribed value and when a state where the accelerator operation detection sensor detects that the accelerator operation is not being performed has continued for a prescribed period of time or longer.

9. The vehicle assistance control apparatus according to claim 8, further comprising:
   a notification mechanism to visually or audibly inform that the drive power is being restricted, when the drive power is being restricted by the electronic controller.

10. The vehicle assistance control apparatus according to claim 9, wherein the notification mechanism includes a display to issue a warning display indicating that the drive power is being restricted by the electronic controller.

11. The vehicle assistance control apparatus according to claim 10, wherein the display also issues a display of a cancellation switch for use in the cancelling operation, when the speed detected by the host vehicle speed detection sensor is equal to or lower than the prescribed value, and when the state where the accelerator operation detection sensor detects that the accelerator operation is not being performed has continued for the prescribed period of time or longer, after starting the warning display.

12. The vehicle assistance control apparatus according to claim 11, wherein the display issues the display of the cancellation switch instead of the warning display, when the speed detected by the host vehicle speed detection sensor is equal to or lower than the prescribed value, and when the state where the accelerator operation detection sensor detects that the accelerator operation is not being performed has continued for the prescribed period of time or longer, after starting the warning display.

13. The vehicle assistance control apparatus according to claim 8, wherein the electronic controller is further configured to increase an extent of restriction by which the drive power is restricted, as a distance from the host vehicle to the prescribed obstacle detected by the obstacle detection sensor becomes shorter.

14. A vehicle assistance control apparatus, comprising:
an obstacle detection sensor that detects a prescribed obstacle in a periphery of a host vehicle;
an accelerator operation detection sensor that detects presence or absence of an accelerator operation;
a host vehicle speed detection sensor that detects a speed of the host vehicle; and
an electronic controller configured to:
restrict, when the prescribed obstacle is detected by the obstacle detection sensor, a drive power that is to be generated in the host vehicle by an accelerator operation performed by a driver, compared to when the prescribed obstacle is not detected;
determine that the host vehicle is stuck, from when the accelerator operation detection sensor detects that the accelerator operation is being performed and the speed detected by the host vehicle speed detection sensor starts to be equal to or lower than a prescribed value, until the speed becomes greater than the prescribed value; and
cancel the restriction of the drive power by a cancelling operation performed by the driver, when a state where the host vehicle is determined to be stuck has continued for a prescribed period of time or longer.

15. The vehicle assistance control apparatus according to claim 14, further comprising:
a notification mechanism to visually or audibly inform that the drive power is being restricted, when the drive power is being restricted by the electronic controller.

16. The vehicle assistance control apparatus according to claim 15, wherein the notification mechanism includes a display to issue a warning display indicating that the drive power is being restricted by the electronic controller.

17. The vehicle assistance control apparatus according to claim 16, wherein the display also issues a display of a cancellation switch for use in the cancelling operation, when the speed detected by the host vehicle speed detection sensor is equal to or lower than the prescribed value, and when the state where the accelerator operation detection sensor detects that the accelerator operation is not being performed has continued for the prescribed period of time or longer, after starting the warning display.

18. The vehicle assistance control apparatus according to claim 17, wherein the display issues the display of the cancellation switch instead of the warning display, when the speed detected by the host vehicle speed detection sensor is equal to or lower than the prescribed value, and when the state where the accelerator operation detection sensor detects that the accelerator operation is not being performed has continued for the prescribed period of time or longer, after starting the warning display.

19. The vehicle assistance control apparatus according to claim 14, wherein the electronic controller is further configured to increase an extent of restriction by which the drive power is restricted, as a distance from the host vehicle to the prescribed obstacle detected by the obstacle detection sensor becomes shorter.

* * * * *